(12) United States Patent
Takase

(10) Patent No.: US 11,258,910 B2
(45) Date of Patent: Feb. 22, 2022

(54) IMAGE READING APPARATUS AND METHOD OF CONTROLLING THE SAME

(71) Applicant: SEIKO EPSON CORPORATION, Tokyo (JP)

(72) Inventor: Yuji Takase, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/877,567

(22) Filed: May 19, 2020

(65) Prior Publication Data

US 2020/0374411 A1 Nov. 26, 2020

(30) Foreign Application Priority Data

May 22, 2019 (JP) .............................. JP2019-095786

(51) Int. Cl.
*H04N 1/00* (2006.01)

(52) U.S. Cl.
CPC ..... *H04N 1/00482* (2013.01); *H04N 1/00477* (2013.01); *H04N 1/00517* (2013.01); *H04N 1/004* (2013.01)

(58) Field of Classification Search
CPC ........... H04N 1/00482; H04N 1/00517; H04N 1/00477; H04N 1/004
USPC ....................................................... 358/1.15
See application file for complete search history.

(56) References Cited

U.S. PATENT DOCUMENTS

| 8,836,965 B2 * | 9/2014 | Yamada ................. G06F 3/1234 358/1.14 |
| 2004/0042049 A1 * | 3/2004 | Hulan .................. H04N 1/32363 358/404 |
| 2013/0329250 A1 * | 12/2013 | Takamiya .......... H04N 1/32058 358/1.15 |
| 2020/0304728 A1 * | 9/2020 | Shibata ................. G06F 3/0488 |

FOREIGN PATENT DOCUMENTS

JP 2015-188243 A 10/2015

* cited by examiner

*Primary Examiner* — Marcus T Riley
*Assistant Examiner* — Darryl V Dottin
(74) *Attorney, Agent, or Firm* — Workman Nydegger

(57) ABSTRACT

An image reading apparatus includes a document reader, a display section of a screen, an operation reception section configured to receive operation on the screen, and a controller configured to output processing of image data in accordance with output settings. The operation includes simple operation for selecting an output destination to receive output of the image data. When the operation reception section receives the simple operation, the controller starts reading the document by the reader, displays a screen indicating reading in a display period including a read period until reading of the document is completed, and displays another screen after the display period. The operation reception section is configured to receive change operation of the output settings in a reception period included in the display period, and when the change operation is received, the controller outputs processing of the image data in accordance with the changed output settings.

7 Claims, 11 Drawing Sheets

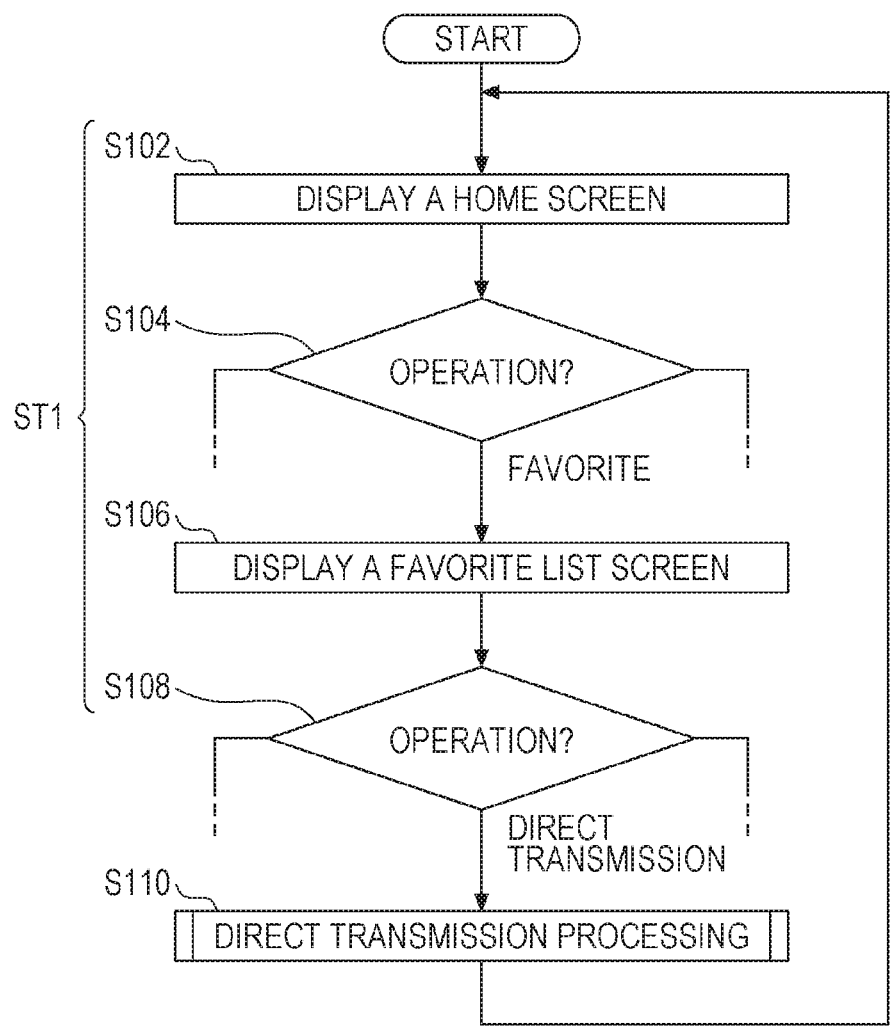

| CLOSE | TRANSMITTING |

DESTINATION   hijklm@temp.co.jp ~— IM1

COLOR                FIRST PAGE
PDF                  SKIP BLANK PAGE  1 PAGE
SINGLE SIDE          0.1 MB / 5 MB
1200 dpi

| CLOSE | TRANSMITTING |

DESTINATION   abcdef@temp.co.jp

COLOR                FIRST PAGE
PDF                  SKIP BLANK PAGE  1 PAGE
SINGLE SIDE          0.1 MB / 5 MB
1200 dpi

```
┌─────────────────────────────────────────────────┐
│                   SCANNING                      │
├─────────────────────────────────────────────────┤
│  DESTINATION      abcdef@temp.co.jp             │
│  TRANSFER TO DESTINATION IS HELD.               │
│  TRANSFER IS AUTOMATICALLY STARTED AFTER 10 SECONDS. │
│  WHEN CHANGING THE OUTPUT SETTINGS, PRESS "OUTPUT    │
│  SETTING CHANGE".                               │
│                                                 │
│   [OUTPUT SETTING CHANGE]      [CANCEL]         │
└─────────────────────────────────────────────────┘
              B7                      B4
```

| OUTPUT SETTINGS | | |
|---|---|---|
| DESTINATION | abcdef@temp.co.jp | C1 |
| COLOR/MONOCHROME | COLOR | C2 |
| FILE FORMAT | PDF | C3 |
| SINGLE SIDE/DOUBLE SIDE | SINGLE SIDE | C4 |
| RESOLUTION | 1200 dpi | C5 |

```
┌─────────────────────────────────────────────────┐
│                   SCANNING                      │
├─────────────────────────────────────────────────┤
│  DESTINATION      abcdef@temp.co.jp             │
│                                                 │
│  COLOR                  FIRST PAGE              │
│IM1─ JPEG                SKIP BLANK PAGE  1 PAGE │
│  SINGLE SIDE            0.0 MB / 5 MB           │
│  1200 dpi                                       │
│                                                 │
│   [DESTINATION CHANGE]         [CANCEL]         │
└─────────────────────────────────────────────────┘
              B2                      B4
```

IMAGE READING APPARATUS AND METHOD OF CONTROLLING THE SAME

The present application is based on, and claims priority from JP Application Serial Number 2019-095786, filed May 22, 2019, the disclosure of which is hereby incorporated by reference herein in its entirety.

BACKGROUND

1. Technical Field

The present disclosure relates to an image reading apparatus configured to receive operation on a display screen and a method of controlling the image reading apparatus.

2. Related Art

When an image reading apparatus receives operation specifying a transmission destination from a user via, for example, a touch panel, or the like, the image reading apparatus generates image data by reading a document by a reader and transmits the image data to an external terminal. When an image processing apparatus disclosed in JP-A-2015-188243 receives an operation of a one-touch key or a speed dial to which a transmission destination is assigned, the image processing apparatus displays a confirmation screen for confirming the transmission destination. The confirmation screen is provided with an OK button and a cancel button. When the image processing apparatus receives operation of the OK button, the image processing apparatus starts data transmission, whereas when the image processing apparatus receives operation of the cancel button, the image processing apparatus cancels the transmission destination and terminates the processing.

It is necessary for the user of the image processing apparatus described above to operate a one-touch key or a speed dial to transmit data, and then view the confirmation screen and operates the OK button. At this time, when the cancel button is operated, it is necessary for the user to specify a transmission destination again, and to cause the image processing apparatus to read the document.

SUMMARY

An advantage of some aspects of the present disclosure is that it improves user-friendliness while suppressing incorrect transmission by simple and speedy operation. According to an aspect of the present disclosure, there is provided an image reading apparatus configured to connect to an external terminal, the image reading apparatus including: a reader configured to generate image data by reading a document; a display section configured to display a screen; an operation reception section configured to receive operation on the screen; and a controller configured to perform output processing of the image data in accordance with output settings including an output destination to receive output of the image data, wherein the operation includes simple operation for selecting the output destination, when the operation reception section receives the simple operation, the controller causes the reader to start reading the document, displays on the display section a first screen indicating reading in a display period including a read period until reading of the document is completed, and displays on the display section a second screen different from the first screen after the display period, and the operation reception section is configured to receive change operation of the output settings in a reception period included in the display period, and when the change operation is received, the controller performs the output processing of the image data in accordance with the changed output settings.

Also, according to another aspect of the present disclosure, there is provided a method of controlling an image reading apparatus including a reader configured to generate image data by reading a document and a display section configured to display a screen, wherein the image reading apparatus is configured to perform output processing of the image data in accordance with output settings including an output destination to receive output of the image data, the method including: a first step of receiving simple operation for selecting the output destination; when the simple operation is received, a second step of causing the reader to start reading the document, and displaying on the display section a first screen indicating reading in a display period including a read period until reading of the document is completed; a third step of displaying on the display section a second screen different from the first screen after the display period; and a fourth step of receiving the change operation when change operation of the output settings is performed in a reception period included in the display period, and performing the output processing of the image data in accordance with the changed output settings.

BRIEF DESCRIPTION OF THE DRAWINGS

FIG. 4 is a flowchart illustrating an example of main processing performed by a controller.

FIGS. 7A and 7B are diagrams schematically illustrating examples of second screens illustrating transmitting.

FIG. 11A is a diagram schematically illustrating another example of the first screen, FIG. 11B is a diagram schematically illustrating an example of an output setting change screen, and FIG. 11C is a diagram schematically illustrating another example of the first screen.

DESCRIPTION OF EXEMPLARY EMBODIMENTS

In the following, a description will be given of embodiments of the present disclosure. Of course, the following embodiments are only examples of the present disclosure, and all the characteristics described in the embodiments are not necessarily required for solving means of the disclosure.

1. Technology Overview Included in the Present Disclosure

First, a description will be given of technology overview included in the present disclosure with reference to the examples illustrated in FIGS. 1 to 11. In this regard, the diagrams in the application concerned are diagrams schematically illustrating examples. The magnification ratio in each direction illustrated in these diagrams sometimes differs, and each of the diagrams is sometimes inconsistent. Of course, each component in the present technology is not limited to a specific example denoted by a sign. In "Technology Overview included in the Present Disclosure", a word in parentheses means a supplementary explanation of the word immediately before.

Mode 1

Figure 1:
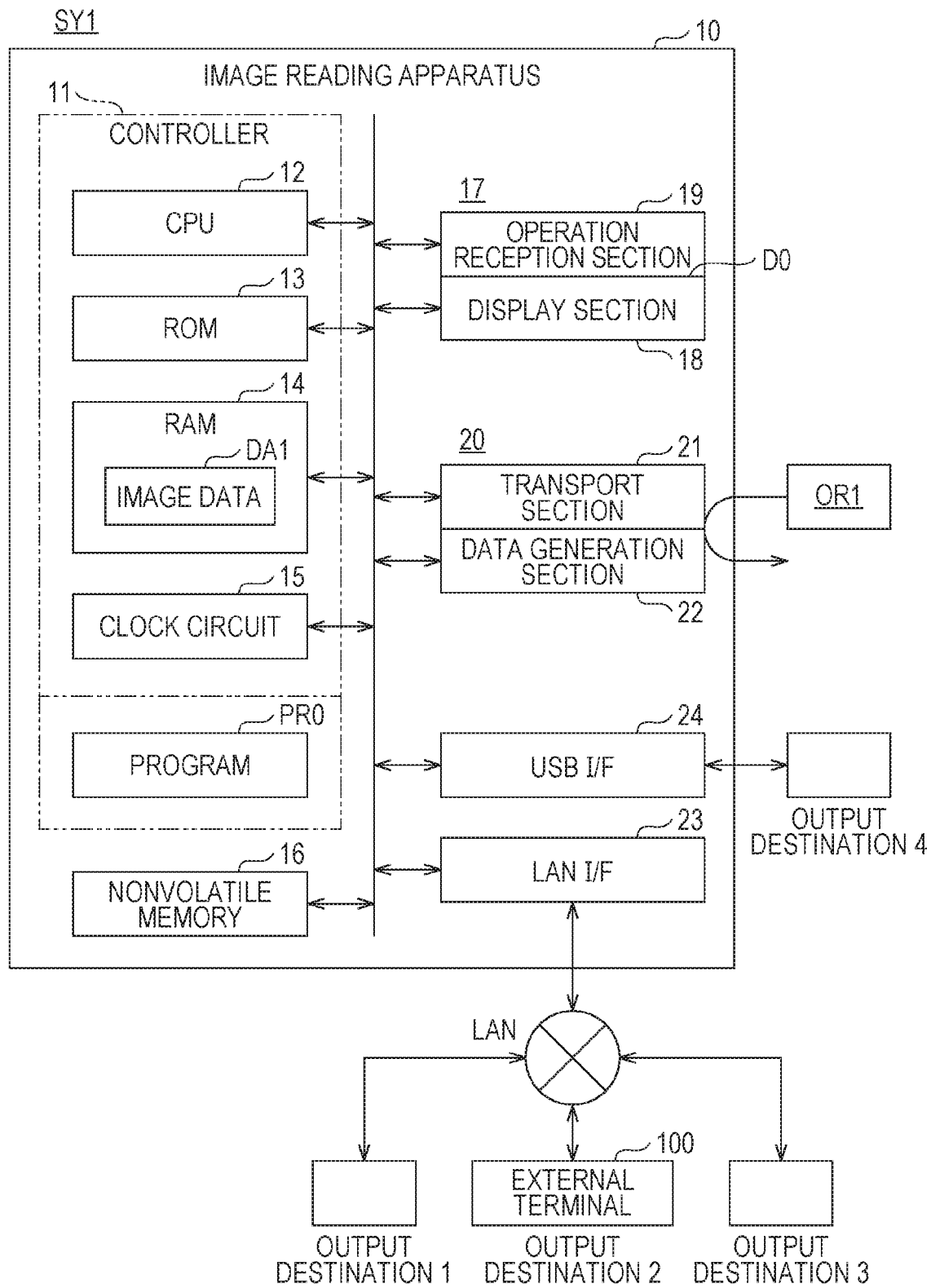
FIG. 1 is a block diagram schematically illustrating an example of the configuration of an image reading system.
Figure 2:
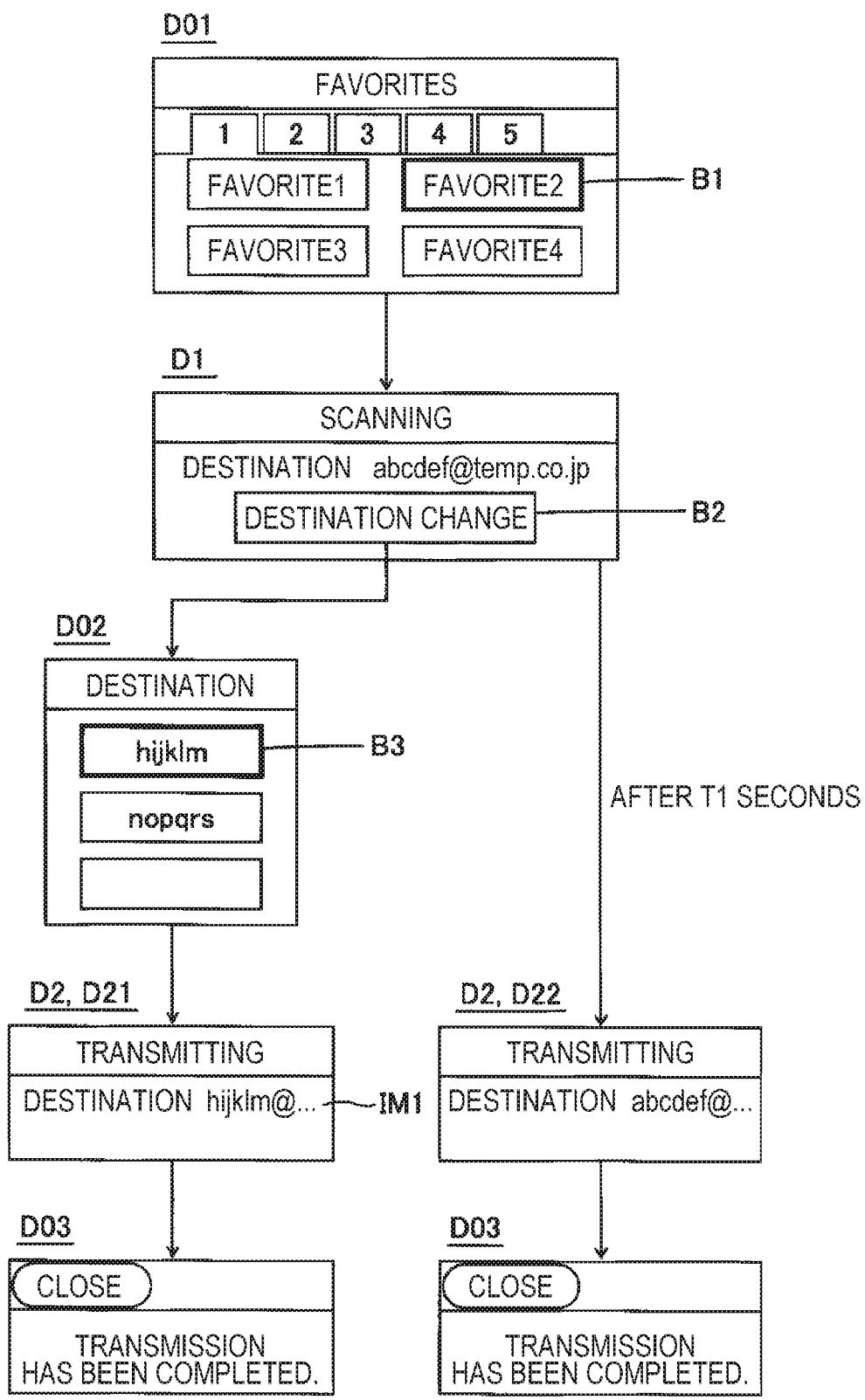
FIG. 2 is a diagram schematically illustrating an example of screen changes.

As illustrated in FIG. 1, an image reading apparatus 10 according to one mode of the present technique is an image reading apparatus 10 configured to connect to an external terminal 100 and includes a reader 20 that generates image data DA1 by reading a document OR1, a display section 18 that displays a screen D0, an operation reception section 19 that receives operation on the screen D0, and a controller 11 that performs output processing of the image data DA1 in accordance with the output settings including an output destination to which the image data DA1 is output. As illustrated in FIG. 2, and the like, the operation includes simple operation for selecting the output destination. When the operation reception section 19 receives the simple operation, the controller 11 causes the reader 20 to start reading of the document OR1, causes the display section 18 to display a first screen D1 indicating reading during a display period T1 (refer to FIGS. 3A to 3C) including a read period T2 during which reading of the document OR1 is completed, and after the display period T1, the controller 11 causes the display section 18 to display a second screen D2 different from the first screen D1. In a reception period 14 included in the display period T1, it is possible for the operation reception section 19 to receive change operation of the output settings, and when the change operation is received, the controller 11 performs the output processing of the image data DA1 in accordance with the changed output settings.

In the mode 1, when a user performs the simple operation, reading of the document OR1 is started, and the first screen D1 is displayed in the display period T1 including the read period T2 until which reading of the document OR1 is completed, and the second screen D2 is displayed after the display period T1. The image data DA1 generated by reading the document OR1 is output in accordance with the output settings. Here, during the reception period T4 included in the display period T1, it is possible for the user to perform change operation of the output settings, and when the change operation is performed, the image data DA1 is output in accordance with the output settings. Thereby, while keeping user-friendliness of the simple operation, it becomes possible for the user to change the unintended output settings. Accordingly, it is possible for the present mode to provide an image reading apparatus that improves user-friendliness of the simple operation for selecting an output destination.

Here, the image reading apparatus includes a scanner, a facsimile, a complex machine having a reading function of a document and an output function of image data, and the like. The operation reception section includes a touch panel attached to the surface of a display panel, hard keys, and the like. The output settings include the file format of image data, the resolution of image data, and the like in addition to an output destination. The simple operation includes operation for instructing reading of a document and network transmission (including mail transmission) of image data, operation for instructing facsimile transmission of a document, and the like. The display period during which the first screen is displayed may match the read period or may be longer than the read period. The reception period of change operation may match the display period or may be shorter than the display period. In the present disclosure, "first", "second", "third", and the like are terms for identifying each component and does not mean order. In this regard, the additional remarks described above are also applied to the following modes.

Mode 2

As illustrated in FIG. 2, and the like, the change operation may include output destination change operation for changing the output destination. The first screen D1 may include an output destination change reception section (for example, a destination change button B2) for receiving the output destination change operation. When the operation reception section 19 receives the output destination change operation associated with the output destination change reception section (B2), the controller 11 may perform output processing of the image data DA1 to the changed output destination. In the case of the mode 2, in the reception period 14 included in the display period T1 of the first screen D1, it is possible for the user to perform output destination change operation, and when the output destination change operation is performed, the image data DA1 is output to the output destination. Thereby, it becomes possible to change an unintended output destination while keeping user-friendliness of the simple operation. Accordingly, it is possible for the present mode to provide an example suitable for improving user-friendliness of the simple operation.

Mode 3

Figure 3A:
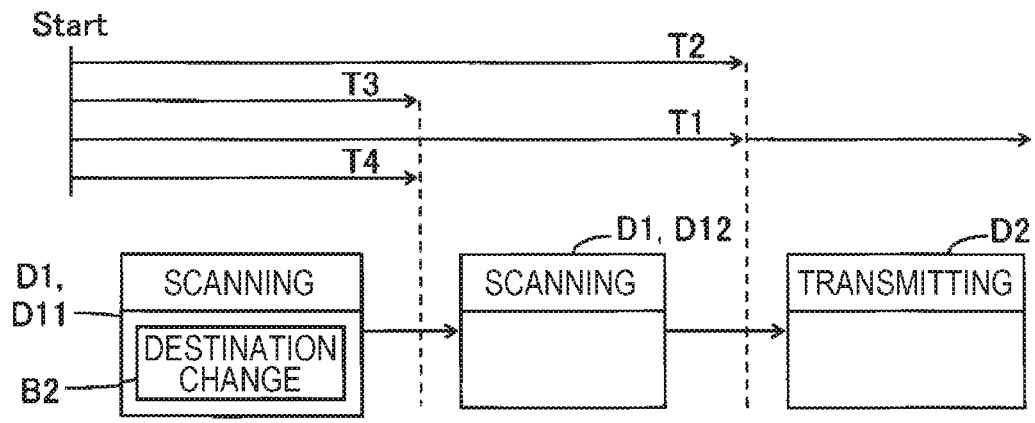
FIGS. 3A to 3C are diagrams schematically illustrating examples of timings to change screens.
Figure 3B:
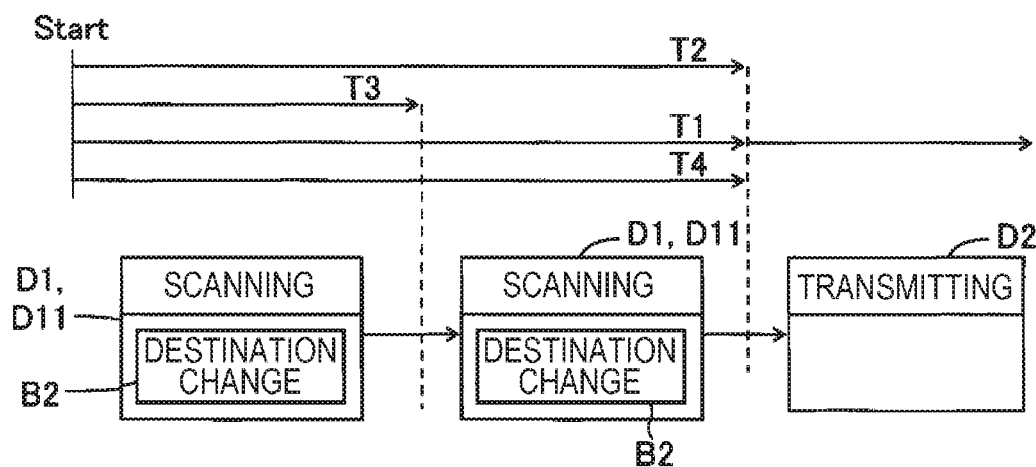
Figure 3C:
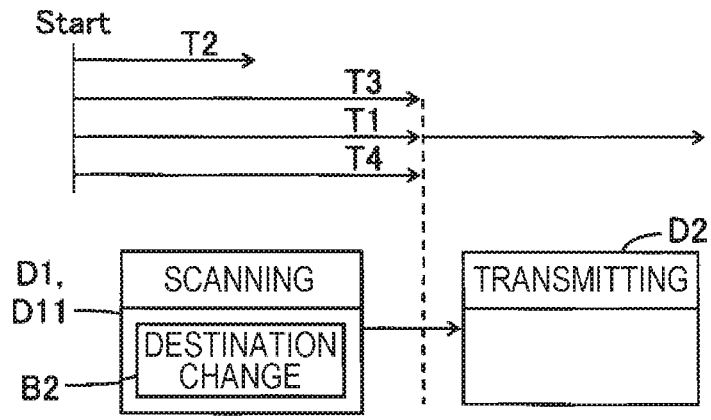

As illustrated in FIGS. 3A to 3C, and the like, the display period T1 may be a longer period between a predetermined period T3, which is the minimum period receivable of change operation of the output settings, and the read period T2. The reception period 14 may include the predetermined period T3. In the mode 3, even when the read period T2 is short, it is possible to perform change operation of the output settings at least in the predetermined period T3. Accordingly, it is possible for the present mode to provide an example suitable for improving user-friendliness of the simple operation.

Mode 4

Figure 5:
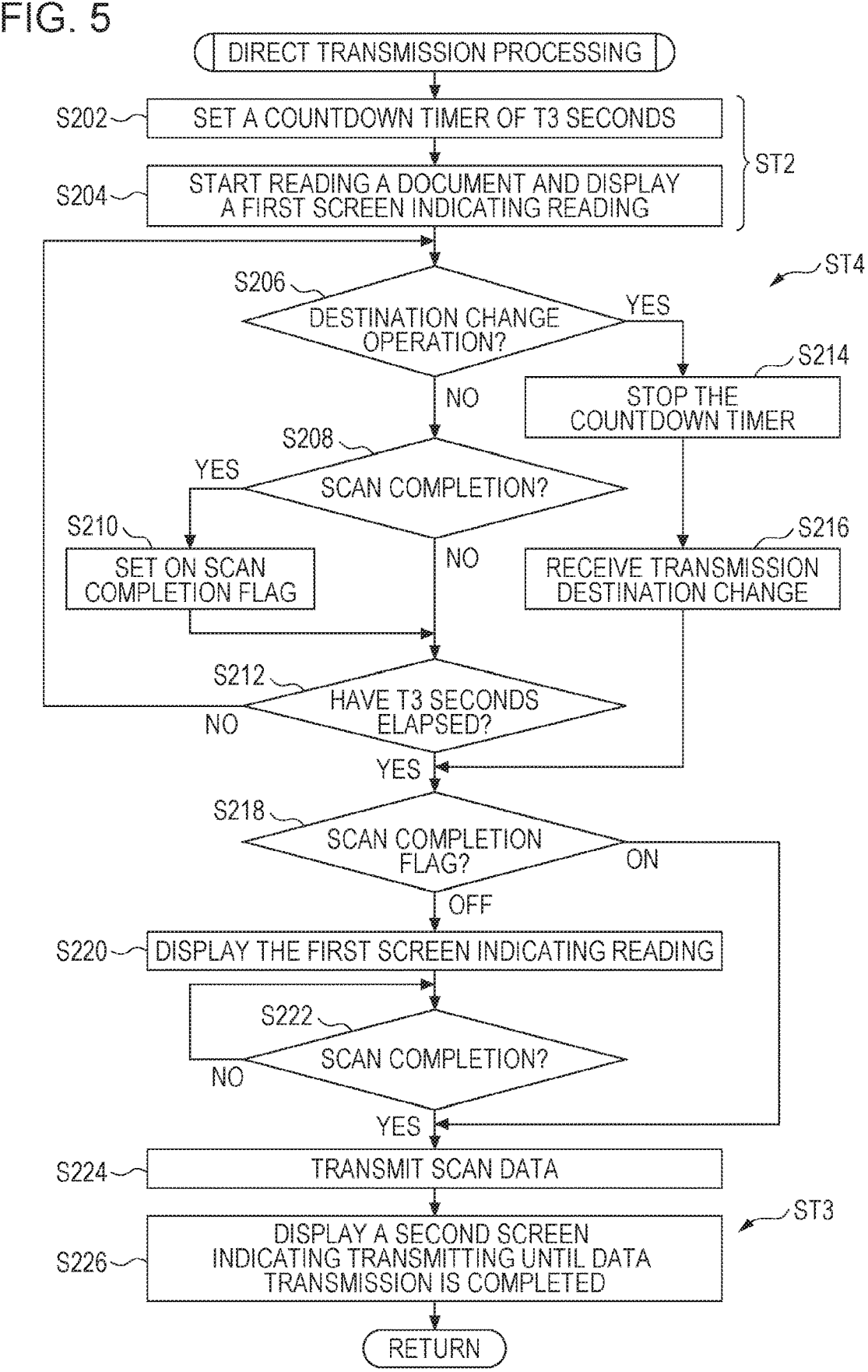
FIG. 5 is a flowchart illustrating an example of direct transmission processing performed by the controller.

As illustrated in FIG. 5, and the like, when reading of the document OR1 is completed at a point in time when reception of the change operation is completed, the controller 11 may cause the display section 18 to display the second screen D2. When reading of the document OR1 is not completed, the controller 11 may cause the display section 18 to display the first screen D1. In this mode, it is possible for the user to confirm whether or not reading of the document OR1 is completed at the time of completion of the change operation, and thus it is possible for the this mode to provide an example suitable for improving user-friendliness of the simple operation.

Mode 5

Figure 6A:
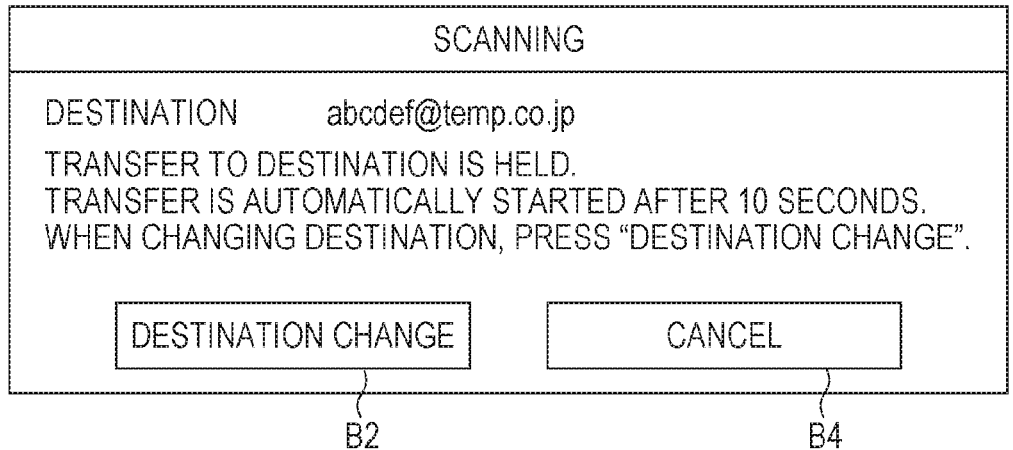
FIG. 6A is a diagram schematically illustrating an example of a first screen illustrating reading.
Figure 6B:
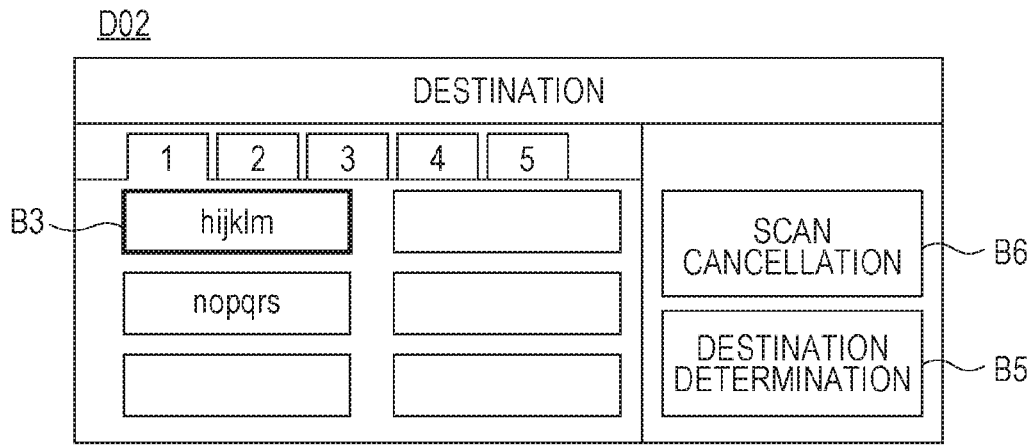
FIG. 6B is a diagram schematically illustrating an example of a destination change screen.
Figure 6C:
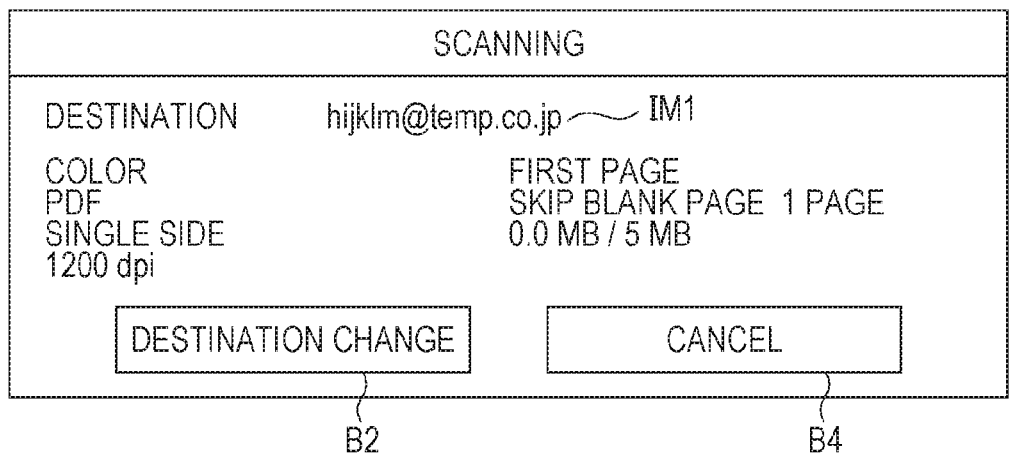
FIG. 6C is a diagram schematically illustrating another example of the first screen.
Figure 8:
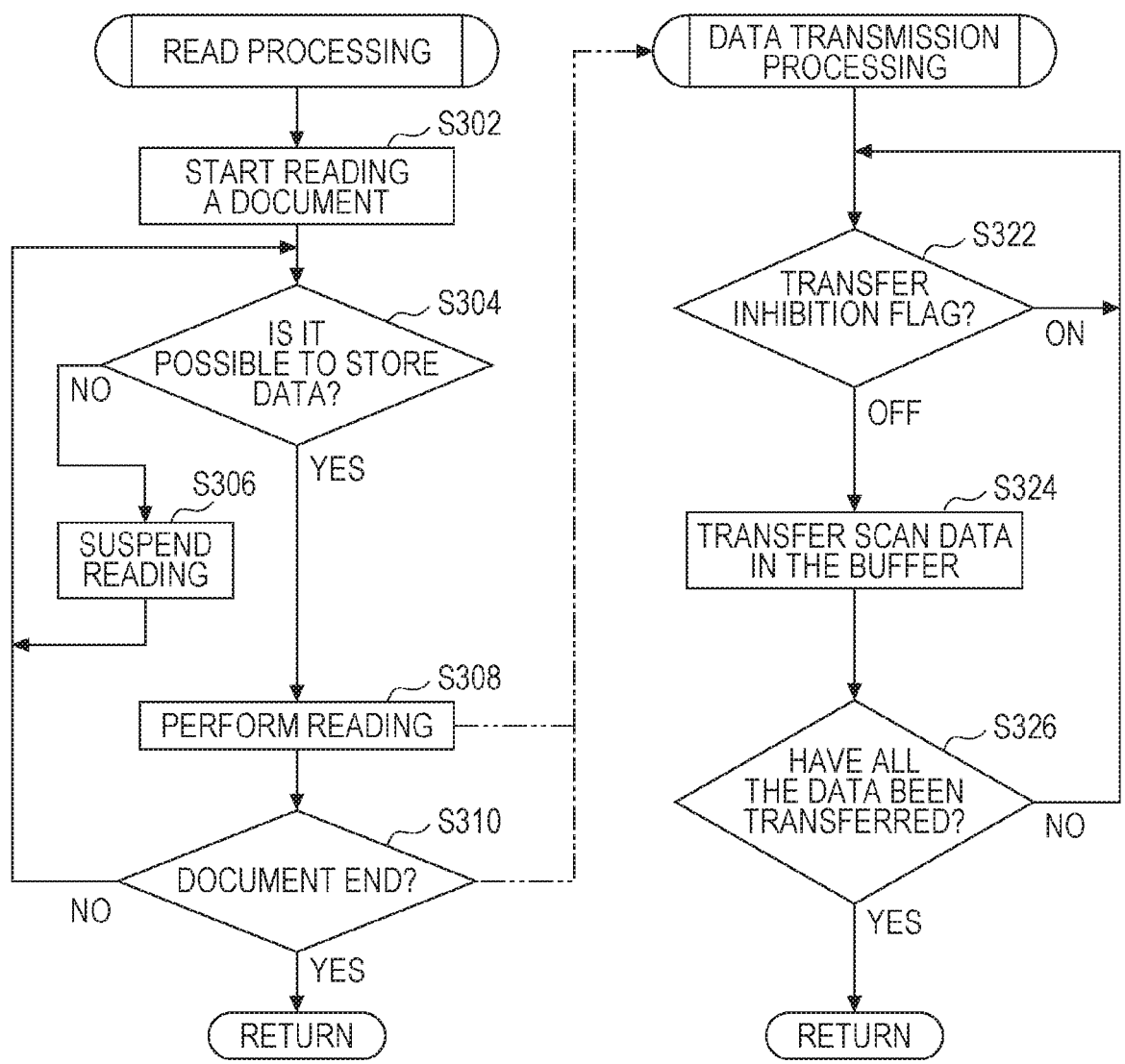
FIG. 8 is a flowchart illustrating an example of sequential scan processing performed by an image reading apparatus.

As illustrated in FIGS. 6C and 11C, and the like, the controller 11 may cause the display section 18 to display the first screen D1 including information (output settings information IM1 illustrated, for example in FIGS. 6C and 11C, and the like) representing the changed output settings. In this mode, it is possible for the user who has viewed the first screen D1 to confirm the output settings after the change, and thus in this mode, it is possible for the user to provide an example suitable for improving user-friendliness of the simple operation.

Mode 6

Figure 10:
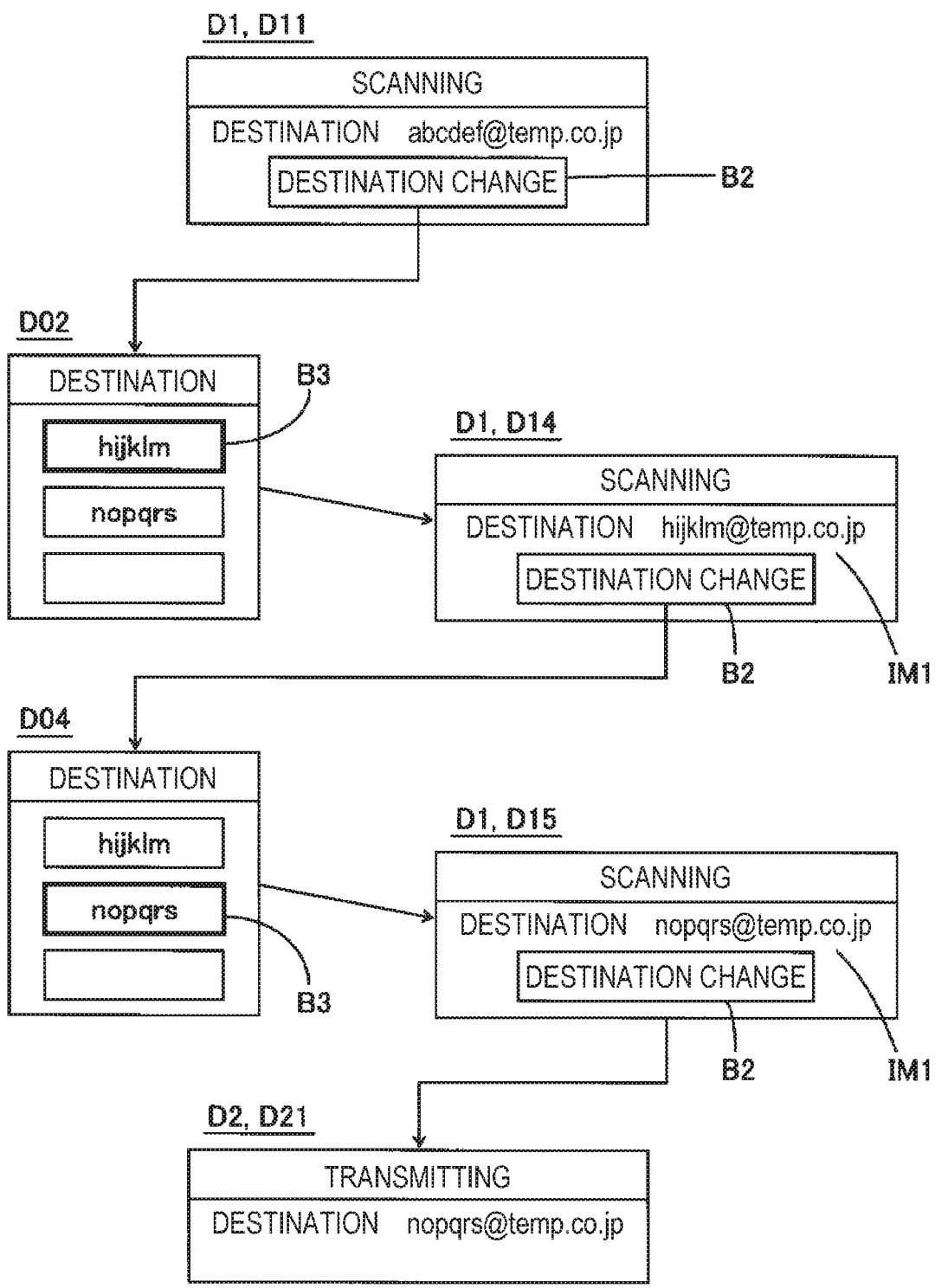
FIG. 10 is a diagram schematically illustrating another example of screen changes.

As illustrated in FIG. 10, after the controller 11 causes the display section 18 to display the first screen D1 including information (for example, output settings information IM1 illustrated by the first screen D14 in FIG. 10) representing the changed output settings, the operation reception section 19 may further receive the change operation in the reception period T4. When the change operation is further received, the controller 11 may cause the display section 18 to display the first screen D1 including information (for example, output settings information IM1 illustrated by the first screen D15 in FIG. 10) representing the changed output settings, and may further perform output processing of the image data DA1 in accordance with the changed output settings. In this mode, it is possible for the user to further perform change operation of the output settings in the reception period T4, and thus it is possible to provide an example suitable for improving user-friendliness of the simple operation.

Mode 7

Incidentally, as illustrated in FIGS. 1, 4, and 5, and the like, a control method according to one mode of the present technique is a method of controlling an image reading apparatus 10 including the reader 20 configured to generate the image data DA1 by reading the document OR1, the display section 18 configured to display the screen D0, and image reading apparatus 10 configured to perform output processing in accordance with the output settings including an output destination for outputting the image data DA1, and includes first step ST1, second step ST2, third step ST3, and fourth step ST4. The first step ST1 is a step of receiving simple operation for selecting the output destination. The second step ST2 is a step in which when the simple operation is received, the reader 20 is caused to read the document OR1, and the display section 18 is caused to display the first screen D1 indicating reading in the display period T1 including the read period T2 until reading of the document OR1 is completed. The third step ST3 is a step of displaying the second screen D2 different from the first screen D1 on the display section 18 after the display period T1. The fourth step ST4 is a step of receiving the change operation when change operation of the output settings is performed in the reception period T4 included in the display period T1, and performing output processing of the image data DA1 in accordance with the changed output settings.

In the mode 7, when the user performs simple operation, reading of the document OR1 is started, the first screen D1 is displayed in the display period T1 including the read period T2 until reading of document OR1 is completed, and the second screen D2 is displayed after the display period T1. Here, it is possible for the user to perform change operation of the output settings in the reception period 14 included in the display period T1, and when the change operation is performed, the image data DA1 is output in accordance with the changed output settings. Thereby, it becomes possible for the user to change unintended output settings while keeping user-friendliness of the simple operation. Accordingly, in this mode, it is possible to provide a method of controlling an image reading apparatus that improves user-friendliness of the simple operation for selecting an output destination.

Further, it is possible to apply the present technique to an image reading system including an image reading apparatus, a method of controlling an image reading system, a control program of an image reading apparatus, a control program of an image reading system, a computer readable medium recording a control program of any one of the above, and the like. The image reading apparatus or the image reading system may be constituted by a plurality of distributed parts.

2. Specific Example of Image Reading Apparatus

FIG. 1 schematically illustrates the configuration of an image reading system. An image reading system SY1 illustrated in FIG. 1 includes an image reading apparatus 10 and one or more external terminals 100.

The image reading apparatus 10 illustrated in FIG. 1 is a scanner that reads the document OR1, and outputs the image data DA1 generated by reading the document OR1. The image data DA1 is read data of the document OR1. The image reading apparatus 10 includes a CPU 12, which is a processor, a ROM 13, which is a semiconductor memory, a RAM 14, which is a semiconductor memory, a clock circuit 15, a nonvolatile memory 16, an operation panel 17, a reader 20, a LAN interface 23, and a USB interface 24. Here, CPU is an abbreviation of central processing unit, ROM is an abbreviation of read only memory, RAM is an abbreviation of random access memory, LAN is an abbreviation of local area network, USB is an abbreviation of universal serial bus, and I/F illustrated in FIG. 1 is an abbreviation of interface. A control program PR0 that causes a computer to function as an image reading apparatus 10 is held at least in one of the ROM 13 and the nonvolatile memory 16, and is executed by the CPU 12. The CPU 12 executes the program PR0 while using the RAM 14 as a work area so as to perform various kinds of processing, such as control processing of the operation panel 17, control processing of the reader 20, and output processing of the image data DA1. The above-described components 12 to 15 are examples of the controller 11. A processor included in the controller 11 is not limited to one CPU, and may be a plurality of CPUs, a hardware circuit, such as an ASIC, a combination of a CPU and a hardware circuit, or the like. Here, ASIC is an abbreviation of application specific integrated circuit. The RAM 14 includes a buffer that temporarily stores the image data DA1.

For the nonvolatile memory 16, it is possible to use a semiconductor memory, such as a flash memory, a magnetic recording medium, such as a hard disk, or the like. When the nonvolatile memory 16 stores the program PR0, the nonvolatile memory 16 becomes a computer readable medium recording the program PR0.

The operation panel 17 includes a display section 18 that displays the screen D0 and an operation reception section 19 that receives operation on the screen D0. It is possible for the display section 18 to use a display panel, such as a liquid crystal panel, or the like. It is possible for the operation reception section 19 to use a touch panel attached to the surface of the display panel, hard keys including a keyboard, or the like.

The reader 20 includes a transport section 21 that transfers the document OR1 in the transport direction, and a data generation section 22 that generates the image data DA1 from the document OR1. The document OR1 is representatively paper. However, the document OR1 may be a sheet medium, such as a synthetic resin sheet. The objects that appear on the document OR1 include a character, a photograph, a picture, and the like. However, blank paper may be mixed in the document OR1.

The transport section 21 includes a document stacker, a plurality of roller pairs disposed in a transport path passing through the data generation section 22, a servo motor that rotationally drives part of a plurality of rollers, and the like, and transports the document OR1 set in the document stacker along the transport path. The image reading apparatus 10 including the transport section 21 is a kind of sheet feed scanners. When the transport section 21 transports a plurality of sheets of the document OR1 to the data generation section 22 continuously, the transport section 21 is referred to as ADF or automatic paper feeder. Here, ADF is an abbreviation of auto document feeder.

The data generation section 22 includes a light source that radiates light on the document OR1 on the transport path, an image sensor that performs photoelectric conversion, a reception optical system that leads the reflected light from the document OR1 to an image sensor, an analog-digital converter that converts the analog electronic signal output from the image sensor to a digital pixel value group, an image data storage processing section that stores the image data DA1 based on the pixel value group in the RAM 14 as a buffer, and the like. When the reflected light from an object that appears on the document OR1 goes through the reception optical system and is converted into an electronic signal by the image sensor, the image data DA1 based on the pixel value group output from the image sensor is stored in the RAM 14. Accordingly, the document OR1 transported by the transport section 21 is read so that the image data DA1 is obtained, and the image data DA1 is stored in the buffer. In this manner, the reader 20 generates the image data DA1 by reading the document OR1.

The LAN interface 23 is connected to a LAN in a wired or a wireless manner, and transmits and receives data with an external terminal 100 connected to the LAN in accordance with a predetermined communication protocol. The external terminal 100 may be connected to a LAN via the Internet. An image reading apparatus 10 connected to a network, such as a LAN, or the like is also referred to as a network scanner. The USB interface 24 transmits and receives data with an external terminal 100 via a USB cable in accordance with a USB standard. In this regard, the communication interface that communicates with the external terminal 100 is not limited to the above-described interfaces 23 and 24, and may be an interface in accordance with a Wi-Fi direct method, an interface connected to the Internet not via a LAN, or the like.

The external terminal 100 usable in the image reading system SY1 is not particularly limited to a computer, such as a personal computer, a tablet terminal, a mobile phone, such as a smartphone, or the like. It is possible for the image reading apparatus 10 to transmit the image data DA1 held in the RAM 14 to the external terminal 100. The image reading apparatus 10 stores an output destination to which the image data DA1 is output by the simple operation in the semiconductor memory 16. FIG. 1 illustrates that output destinations 1 to 3 are assigned to three external terminals 100 connected to the LAN, and an output destination 4 is assigned to an external terminal 100 connected to the USB interface 24 via the USB cable. When the output destination is an external terminal 100, it is possible to handle a transmission destination that identifies the external terminal 100 as an output destination. Also, the output destination may be a component built in the image reading apparatus, for example, a storage device, a printer, or the like.

In this regard, the image reading apparatus 10 is not limited to a scanner dedicated machine and may be a complex machine having at least part of a print function, a facsimile communication function, an electronic mail transmission function, and the like. Also, the image reading apparatus 10 may include all the components in one casing, or may be configured by a plurality of devices that are divided in a communicable manner with each other.

FIG. 2 schematically illustrates an example of changes of the screen D0 displayed on the display section 18. The top part, a screen D01, illustrates a favorite list screen. Each favorite is associated with a corresponding output destination. A description will be given with reference to FIGS. 1 and 2. For example, it is possible to associate "favorite1", "favorite2", "favorite3", and "favorite4" with output destinations 1, 2, 3, and 4 respectively. In the state in which the favorite list screen D01 is displayed, the operation reception section 19 receives simple operation for selecting any one of a plurality of favorite buttons B1 included in the list screen D01. The simple operation is operation for selecting an output destination, which means operation to execute reading of the document OR1 and transmission of the image data DA1 with fewer operation steps than the case of directly inputting an output destination of the image data DA1. Transmission of the image data DA1 may be a mail transmission. For example, when a user touches the "favorite2" button with a finger, the controller 11 performs processing to cause the reader 20 to read the document OR1 and output processing to the output destination associated with "favorite2". In this manner, it is possible to execute reading of the document OR1 and transmission of the image data DA1 by the operation of the favorite button B1, and thus the operation of the favorite button B1 is said to be simple and speedy operation for instructing a direct transmission, a quick start, and a one-touch transmission. Also, it is possible to perform operation to invoke favorites from a home screen and to select a favorite, and this operation is also included in the simple operation compared with the case of directly inputting an output destination.

It is possible for a network scanner to directly transmit read data to a transmission destination without going through an external computer, such as a personal computer. Accordingly, it is possible to prevent data leakage in which read data is saved in an external computer and then is copied or transported to another place. Also, it is possible for a user to store often-used scan settings as a favorite so as to cause a network scanner to perform simple and speedy direct transmission. Accordingly, a network scanner is widely used from small and medium-sized companies, such as SOHO to government offices and large companies. Here, SOHO is an abbreviation of Small Office/Home Office.

When a touch panel is used for the operation reception section, there is a possibility that a user mistakenly touches the touch panel by a finger, and thus unintentional direct transmission is started. Incorrect transmission occurs when this direct transmission is not canceled. In this manner, direct transmission is convenient since it is realized by simple and speedy operation. However, there is a risk of incorrect transmission and a risk of data leakage. Such a risk occurs not only when direct transmission is performed, but when various kinds of simple operation are performed.

In this specific example, as illustrated in FIG. 2, the first screen D1 indicating reading of the document OR1 is displayed immediately after the simple operation. Thereby, when there is no problem with the transmission destination, the image data DA1 is transmitted without doing any operation, and when there is a problem with the transmission destination, it is possible to change the transmission destination. Accordingly, convenient user-friendliness of direct transmission remains, and it is possible for the user to change unintended simple operation.

The first screen D1 illustrated in FIG. 2 is displayed on the display section 18 immediately after any one favorite button B1 is operated from the list screen D01, and includes a display area of the transmission destination associated with the operated favorite button B1. The first screen D1 also includes the destination change button B2 for receiving output destination change operation that changes the transmission destination. The destination change button B2 is an example of the output destination change reception section. When touch operation is performed on the destination change button B2 during the display period T1 described later, the destination change screen D02 receiving change operation of the transmission destination is displayed on the display section 18. The destination change screen D02 includes a plurality of destination buttons B3. The operation reception section 19 receives operation for selecting any one of the plurality of destination buttons B3. For example, when a user touches the "hijklm" button with a finger, the transmission destination is changed from "abcdef . . . " to "hijklm . . . ". Immediately after the display period T1, a second screen D21 indicating transmitting of the image data DA1 to the changed transmission destination is displayed on the display section 18. The second screen D21 includes a display area of the output settings information IM1 indicating the changed transmission destination. When the transmission of the image data DA1 is completed, a transmission end screen D03 is displayed on the display section 18.

When no operation is performed during the display period T1 after the first screen D1 is displayed, a second screen D22 indicating transmitting of the image data DA1 to the unchanged transmission destination is displayed on the display section 18. The second screen D22 includes a display area of information indicating the unchanged transmission destination. When the transmission of the image data DA1 is completed, a transmission end screen D03 is displayed on the display section 18. In this regard, the second screens D21 and D22 are included in the second screen D2 of the present technique.

FIGS. 3A to 3C schematically illustrate examples of timing when the screen D0 is changed. FIG. 3A illustrates a change example of the screen D0 when the read period T2 of the document OR1 is longer than a predetermined minimum period T3 during which the first screen D1 indicating reading is displayed. In this case, the display period T1 of the first screen D1 becomes the read period T2. The predetermined period T3 illustrated in FIG. 3A matches the reception period T4 during which change operation of the transmission destination is received. In FIG. 3A, during the predetermined period T3 from the start point in time, "Start", of the simple operation, the first screen D11 including the destination change button B2 is displayed on the display section 18. In this regard, the first screen D11 illustrated in FIG. 3A is simplified, and a detailed example of the first screen D11 is illustrated in FIG. 6A described later. Until the read period T2 is terminated immediately after the elapse of the predetermined period T3, the first screen D12 not including the destination change button B2 is displayed on the display section 18. In this regard, the first screens D11 and D12 are included in the first screen D1 of the present technique. Until the transmission of the image data DA1 is completed immediately after the elapse of the read period T2, the second screen D2 indicating transmitting is displayed on the display section 18.

Here, as illustrated in FIG. 3B, the first screen D11 including the destination change button B2 may be displayed on the display section 18 until the read period T2 is terminated immediately after the elapse of the predetermined period T3. In this case, the reception period T4 becomes the read period T2, and it is possible to receive change operation of a transmission destination until the read period T2 is terminated.

FIG. 3C illustrates a change example of the screen D0 when the read period T2 of the document OR1 is shorter than the predetermined minimum period T3. In this case, the display period T1 of the first screen D1 becomes the predetermined period T3. The predetermined period T3 illustrated in FIG. 3C matches the reception period I4 during which the change operation of a transmission destination is received. In FIG. 3C, during the predetermined period T3 from the start point in time, "Start", of the simple operation, the first screen D11 including the destination change button B2 is displayed on the display section 18. Accordingly, the display period T1 is a longer period between the predetermined period T3 and the read period T2, and the reception period T4 includes the predetermined period T3. Until the transmission of the image data DA1 is completed immediately after the elapse of the predetermined period T3, the second screen D2 indicating transmitting is displayed on the display section 18. The predetermined period T3, which is a minimum period during which change operation of a transmission destination is receivable, is set to a time period during which a user thinks sufficiently long to start change operation of a transmission destination after the user views the transmission destination of the first screen D1, for example, about 5 to 15 seconds.

3. First Specific Example of Processing Performed by Image Reading Apparatus FIG. 4 schematically illustrates the main processing performed by the controller 11. Here, steps S102 to S108 correspond to the first step ST1 of receiving simple operation for selecting a transmission destination. In the following, a description of "step" will be omitted. The controller 11 performs a plurality of processes in parallel by multitasking.

When the main processing is started, the controller 11 causes the display section 18 to display the home screen not illustrated in the figure in S102 and branches the processing in accordance with the operation received by the operation reception section 19 in S104. For example, when touch operation is received on the favorite list display field on the home screen, the controller 11 causes the display section 18 to display the favorite list screen D01 as illustrated in FIG. 2 in S106. In S108, the controller 11 branches the processing in accordance with the operation received by the operation reception section 19. For example, when touch operation is received by any one of a plurality of favorite buttons B1 illustrated in FIG. 2, the controller 11 performs direct transmission processing in S110 and returns the processing to S102. In this regard, when the home screen includes the favorite list, it is possible to omit the processing from S104 to S106.

FIG. 5 schematically illustrates the direct transmission processing performed by the controller 11 in S110. Here, the processing of S202 to S204 corresponds to the processing of the second step ST2, the processing of S226 corresponds to the processing of the third step ST3, and the processing of S206 to S224 corresponds to the processing of the fourth step ST4. As a prerequisite for performing the direct transmission processing illustrated in FIG. 5, it is assumed that the image reading apparatus 10 performs saving-type scan in which all the document OR1 is read and then transmission of the image data DA1 is started. Also, a scan completion flag used in S210 and S218 is provided in the RAM 14, and the scan completion flag is set off. When the direct transmission processing is started, in S202, the controller 11 sets a countdown timer that measures a predetermined minimum period T3 during which the first screen D1 indicating reading is displayed. For example, the controller 11 obtains the current time from the clock circuit 15, calculates end time after the T3 seconds from the current time, and ought to store the obtained end time in the RAM 14.

After setting the countdown timer, the controller 11 causes the reader 20 to read the document OR1 in S204, and causes the display section 18 to display the first screen D11 illustrated in FIG. 6A. The first screen D11 includes a display area of information indicating a transmission destination, the destination change button B2 as the output destination change reception section, a cancel button B4, and the like. After displaying the first screen D11, the controller 11 branches the processing in accordance with whether or not the destination change button B2 has been operated in S206. In this regard, when the cancel button B4 has been operated, the controller 11 terminates the direct transmission processing.

When the destination change button B2 has not been operated, the controller 11 branches the processing in accordance with whether or not reading of the document OR1 is completed in S208. In this regard, in the flowchart illustrated in FIG. 5, reading of the document OR1 is described as scan, and the image data DA1 is described as scan data. When reading of the document OR1 is completed, the controller 11 sets on the scan completion flag in S210, and the processing proceeds to S212. When reading of the document OR1 is not completed, the processing of the controller 11 proceeds to the processing of S212 without performing the processing of S210.

In S212, the controller 11 branches the processing in accordance with whether or not a predetermined period T3 have elapsed. For example, when the current time of the clock of the circuit 15 has passed the end time described above, the predetermined time T3 has elapsed, and thus the processing of the controller 11 proceeds to S218. When the current time of the clock of the circuit 15 has not passed the end time described above, the processing of the controller 11 returns to S206.

In S206, when it is determined that the destination change button B2 has been operated, the controller 11 stops the countdown timer in S214. For example, the controller 11 ought to reset the end time described above. After the countdown timer is stopped, the controller 11 causes the display section 18 to display the destination change screen D02 illustrated in FIG. 6B in S216, and receives the output destination change operation by the operation reception section 19. The output destination change operation is the operation associated with the destination change button B2 illustrated in FIG. 6A. The destination change screen D02 includes the plurality of destination buttons B3, a destination determination button B5, a scan cancellation button B6, and the like. For example, when the operation reception section 19 receives operation of the destination determination button B5 after receiving the operation for selecting any one of the plurality of destination buttons B3, the controller 11 receives a transmission destination associated with the selected destination button B3 as the transmission destination after the change. After that, the processing of the controller 11 proceeds to S218. In this regard, when the scan cancellation button B6 is operated, the controller 11 terminates the direct transmission processing.

By the above, when change operation of a transmission destination is not performed during the predetermined period T3 in the state in which the first screen D11 is displayed, the processing of S206 to S212 is repeated and then the processing proceeds to S212. The change operation of a transmission destination is received at least on the assumption that the predetermined period T3 matches the reception period T4. When change operation of a transmission destination is performed while the first screen D11 is displayed, the processing proceeds to S212 even when the predetermined period T3 has not elapsed.

In S218, the controller 11 branches the processing in accordance with the state of the scan completion flag. When the scan completion flag is off, the controller 11 cause the display section 18 to display the first screen D13 illustrated in FIG. 6C in S220. The first screen D13 includes a display area of the output settings information IM1 indicating the changed transmission destination, a display area of the information indicating the output settings other than the transmission destination, the destination change button B2, the cancel button B4, and the like. In this regard, the first screen D13 is included in the first screen D1 of the present technique together with the first screen D11. After displaying the first screen D13, the controller 11 waits until reading of the document OR1 is completed in S222. Here, when the destination change button B2 is operated, the processing of the controller 11 may be returned to S216. The first screen D13 may not include the destination change button B2. When the cancel button B4 is operated, the controller 11 terminates the direct transmission processing.

When the scan completion flag is on in the determination processing in S218, the processing of S220 to S222 is not performed, and the processing of the controller 11 proceeds to S224. By the above, the first screen D1 indicating reading is displayed in the display period T1 including the read period T2 until reading of the document OR1 is completed.

In S224, the controller 11 performs output processing for transmitting the image data DA1 stored in the buffer to the transmission destination. Here, when the output destination change operation associated with the destination change button B2 is received, that is to say, when the change operation of a transmission destination is received, the image data DA1 is transmitted to the changed transmission destination. When the change operation of a transmission destination is not received, the image data DA1 is transmitted to the unchanged transmission destination.

Also, the controller 11 causes the display section 18 to display the second screen D2 illustrated in FIGS. 7A and 7B until transmission of the image data DA1 is completed in S226. The second screen D2 indicating transmitting of the image data DA1 is displayed after the display period T1 of the first screen D1 indicating reading of the document OR1. Here, when change operation of a transmission destination is received, as illustrated in FIG. 7A, the controller 11 causes the display section 18 to display the second screen D21 including a display area of the output settings information IM1 indicating the changed transmission destination. Also, at a point in time of completion of receiving change operation of a transmission destination, when reading of the document OR1 is completed, the second screen D2 is displayed, whereas when reading of the document OR1 is not completed, the first screen D1 is displayed. When change operation of a transmission destination is not received, as illustrated in FIG. 7B, the controller 11 causes the display section 18 to display the second screen D22 including a display area of the information indicating the unchanged transmission destination. In this regard, the second screens D21 and D22 are included in the second screen D2. After the second screen D2 is displayed, the controller 11 terminates the direct transmission processing.

As described above, when the user performs the simple operation, reading of the document OR1 is started, and the first screen D1 indicating reading is displayed during the display period T1 including the read period T2 until reading of the document OR1 is completed. In the reception period T4 included in the display period T1, it is possible for the user to perform change operation of a transmission destination. In this manner, it is possible for this specific example to change a transmission destination when the transmission destination was incorrect, and there is no need to cancel reading of the document and to select a transmission destination again. Accordingly, it is possible for the user to reduce down time.

After the display period T1, the image data DA1 is transmitted to the transmission destination corresponding to the simple operation or the changed transmission destination, and the second screen D2 indicating transmitting is displayed. Here, when the transmission destination is not changed, the image data DA1 is transmitted without performing any operation. Accordingly, when the transmission destination is correct, there is no need to perform operation on the first screen D1 indicating reading. Accordingly, in this specific example, it is possible for the user to change an unintended transmission destination while remaining user-friendliness of the simple operation, and thus it is possible to improve user-friendliness of the simple operation for selecting a transmission destination.

4. Second Specific Example of Processing Performed by Image Reading Apparatus Some of image reading apparatuses have a relatively small buffer capacity, and thus perform sequential scan for transmitting the image data DA1 while reading a document little by little. First, a description will be given of an example of sequential scan processing performed by the image reading apparatus with reference to FIG. 8. In this regard, the configuration of an image reading apparatus that performs sequential scan is substantially the same as that of the image reading apparatus 10 illustrated in FIG. 1. Accordingly, the same signs illustrated in FIG. 1 are used, and the detailed description will be omitted. Also, various screens illustrated in the first specific example are commonly used for the screen D0 displayed on the display section 18. As a prerequisite for performing the data transmission processing illustrated in FIG. 8, it is assumed that the transfer inhibit flag used in S322 is provided in the RAM 14, and the transfer inhibit flag is set off at normal time.

When the operation reception section 19 receives operation to start reading of the document OR1 and transmission of the image data DA1, the reader 20 starts read processing and starts reading of the document OR1 in S302. Next, the reader 20 branches the processing in accordance with whether or not it is possible to store the image data DA1 in the buffer for a predetermined amount, such as for one page in S304. When it is not possible to store the image data DA1 of the predetermined amount in the buffer, the reader 20 suspends reading of the document OR1 in S306, and the processing returns to S304. When it is possible to store the image data DA1 of the predetermined amount in the buffer, the reader 20 performs reading of the document OR1 of the predetermined amount in S308 and notifies the controller 11 of generation of image data DA1 of the predetermined amount. After that, in S310, the reader 20 branches the processing in accordance with whether or not the document OR1 is completed. When the document OR1 is not completed, the reader 20 repeats the processing of S304 to S310.

When the document OR1 is completed, the reader 20 notifies the controller 11 of completion of the document OR1 and terminates the read processing.

When reading of the document OR1 is performed in S308, the controller 11 starts data transmission processing. When the transfer inhibit flag is on in S322, the processing waits until the transfer inhibit flag becomes off. When the transfer inhibit flag is off, the processing proceeds to S324. In S324, the controller 11 transfers the image data DA1 in the buffer to a transmission destination. After that, in S326, the controller 11 branches the processing in accordance with whether or not the image data DA1 corresponding to the entire document OR1 has been transferred. When there remains untransferred image data DA1, the controller 11 repeats the processing of S322 to S326. When the image data DA1 corresponding to the entire document OR1 has been transferred, the controller 11 terminates the data transmission processing.

Figure 9:
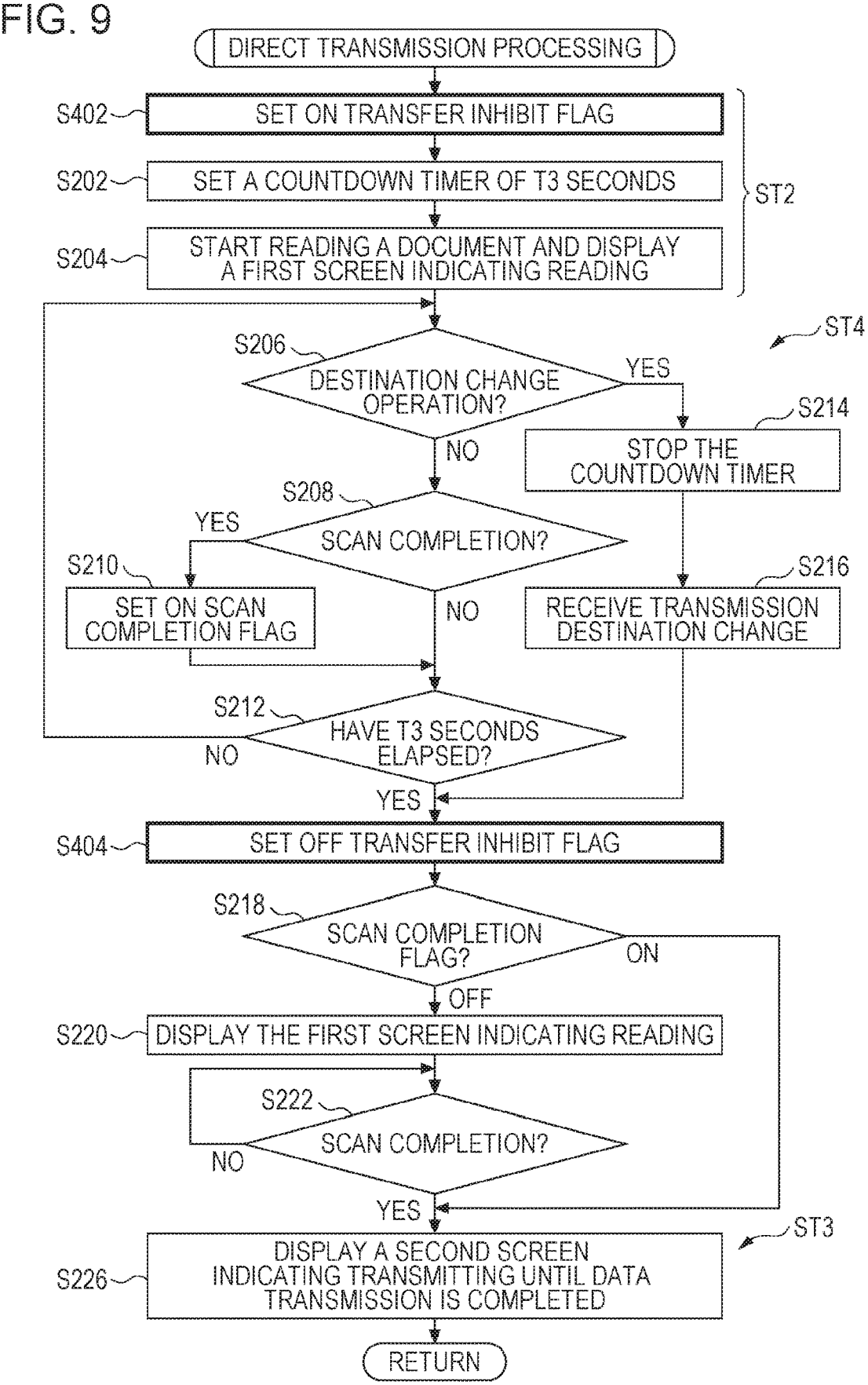
FIG. 9 is a flowchart illustrating another example of the direct transmission processing.

FIG. 9 schematically illustrates direct transmission processing performed by the controller 11 of the image reading apparatus 10 that performs sequential scan. Compared with the direct transmission processing illustrated in FIG. 5, this processing does not include the scan data transmission processing in S224, and additionally includes the processing of S402 and S404, which is surrounded by a bold line. Here, the processing of S402 and S202 to S204 corresponds to the second step ST2, the processing of S226 corresponds to the third step ST3, and the processing of S206 to S216, S404, and S218 to S222 corresponds to the fourth step ST4.

When the direct transmission processing is started, the controller 11 sets on the transfer inhibit flag in S402. Thereby, in the data transmission processing illustrated in FIG. 8, the image data DA1 is caused not to be transferred. As a result, when the buffer becomes not possible to store the image data DA1 of the predetermined amount, reading of the document OR1 is suspended. After that, the controller 11 performs the processing of S202 to S216 and causes the display section 18 to display the first screen D1 indicating reading of the document OR1. When change operation of the transmission destination is performed, the controller changes the transmission destination. After the elapse of the predetermined period T3, or after changing a transmission destination, the controller 11 sets on the transfer inhibit flag in S404. Thereby, in the data transmission processing illustrated in FIG. 8, the image data DA1 is caused to be transferred. After that, the controller 11 performs the processing of S218 to S222. When reading of the entire document OR1 is completed, in S226, the controller 11 causes the display section 18 to display the second screen D2 indicating transmitting of the image data DA1 and terminates the direct transmission processing. As described above, it becomes possible for the image reading apparatus that performs sequential scan to change a transmission destination unintended by the user while remaining user-friendliness of the simple operation, and to improve user-friendliness of the simple operation for selecting a transmission destination.

5. Variations

Various variations are considered from the present disclosure. For example, in the processing described above, it is possible to suitably make changes, such as changing the order of processing, or the like. For example, in the direct transmission processing of FIGS. 5 and 9, it is possible to replace the processing of S202 with the processing of S204.

Also, as illustrated in FIG. 10, the image reading apparatus may receive change operation of a transmission destination any number of times during reading of a document. The first screen D11 illustrated in FIG. 10 is displayed on the display section 18 immediately after any one of favorite buttons B1 is operated from the list screen D01 illustrated in FIG. 2. The reception period T4 during which change operation of a transmission destination is received is a longer period between the predetermined period T3 and the read period T2. When touch operation of the destination change button B2 is performed on the first screen D11 during the reception period T4, the operation reception section 19 receives the operation, and the controller 11 causes the display section 18 to display the destination change screen D02. When touch operation is performed on any one of the destination buttons B3 on the destination change screen D02, the operation reception section 19 receives the operation, and the controller 11 causes the display section 18 to display the first screen D14 including the output settings information IM1 indicating the changed transmission destination. The first screen D14 is displayed until the display period T1 has elapsed, that is to say, until a longer period between the read period T2 and the predetermined period T3 elapses. When touch operation on the destination change button B2 is performed on the first screen D14 during the reception period T4, the operation reception section 19 receives the operation, and the controller 11 causes the display section 18 to display the destination change screen D04. When touch operation is performed on any one of destination buttons B3 on the destination change screen D04, the operation reception section 19 receives the operation, and the controller 11 causes the display section 18 to display the first screen D15 including the output settings information IM1 indicating the changed transmission destination. The first screen D15 is also displayed until the display period T1 elapses. In this regard, the first screens D14 and D15 are included in the first screen D1 of the present technique together with the first screen D11. When the destination change button B2 is not operated until the display period T1 elapses, the controller 11 causes the display section 18 to display the second screen D21 indicating transmitting of the image data DA1 to the changed transmission destination.

By the above, after displaying the first screen D14 including the changed output settings information IM1, it is possible for the user to perform change operation of a transmission destination in the reception period T4. When change operation of a transmission destination is further received on the first screen D14, the first screen D15 including the further changed output settings information IM1 is displayed, and the image data DA1 is output to the further changed transmission destination. Accordingly, it is possible for the user to further confirm the changed transmission destination, and thus user-friendliness of the simple operation is improved. Of course, it is possible to perform change operation of a transmission destination on the first screen D15, and thus it is possible to change the transmission destination any number of times in the reception period T4.

Further, as illustrated in FIGS. 11A to 11C, the output settings to receive change operation in the reception period is not limited to a transmission destination. The first screen D16 illustrated in FIG. 11A is displayed on the display section 18 immediately after any one of favorite buttons B1 is operated on the list screen D01 illustrated in FIG. 2. The first screen D16 includes a display area of the information indicating a transmission destination, an output settings change button B7 as an output destination change reception section, the cancel button B4, and the like. On the first screen D16, when touch operation is performed on the output settings change button B7 during the receiving period T4, the operation receiving section 19 receives the operation, and the controller 11 causes the display section 18 to display the output setting change screen D05 indicating the FIG. 11B. The output setting change screen D05 includes a selection field C1 of a transmission destination, a selection field C2 of an output color, a selection field C3 of a file format, a selection field C4 as to whether single-side reading or double-side reading, and a selection field C5 of resolution. The operation reception section 19 receives selection operation of items in the selection fields C1 to C5. In the selection field C1, it is possible to select a transmission destination. In the selection field C2, it is possible to select either color or monochrome. In the selection field C3, it is possible to select a file format. In the selection field C4, it is possible to select either single-side reading or double-side reading. In the selection field C5, it is possible to select a resolution.

When change operation of the output settings is received on any one of the selection fields C1 to C5, the controller 11 causes the display section 18 to display the first screen D17 as illustrated in FIG. 11C. In this regard, the first screens D16 and D17 are included in the first screen D1 of the present technique. The first screen D17 includes the output settings information IM1 indicating the changed output settings. The output settings information IM1 illustrated in FIG. 11C is the information when JPEG is selected in the file-format selection field C3, and indicates that the file format is changed to JPEG from the original PDF. In this case, the controller 11 converts the image data DA1 into a file of the JPEG format.

When the output color in the output settings before change is color, it is possible to select monochrome in the output-color selection field C2. When monochrome is selected in the selection field C2, the controller 11 converts the generated image data from color to monochrome in accordance with a publicly known conversion expression. When reading is double side in the output settings before conversion, it is possible to select single-side reading in the selection field C4. When single-side reading is selected in the selection field C4, the controller 11 deletes data on the back face from the generated image data. When the resolution in the output settings before change is 1200 dpi, it is possible to select a resolution of less than 1200 dpi in the resolution selection field C5. When 600 dpi is selected in the selection field C5, the controller 11 converts the resolution of the generated image data from 1200 dpi to 600 dpi.

In the examples in FIGS. 11A to 11C, when the output settings of not only a transmission destination, but the output settings other than the transmission destination are incorrect, it is possible to change the output settings. When the output settings are correct, it is not necessary to operate on the first screen D16. Accordingly, it becomes possible for the user to change the unintended output settings while keeping user-friendliness of the simple operation, and thus it is possible to improve user-friendliness of the simple operation for selecting a transmission destination.

6. Conclusion

As described above, with the present disclosure, it is possible to provide a technique of an image reading apparatus, and the like that makes it possible to improve user-friendliness of the simple operation for selecting an output destination by various modes. Of course, with a technique including only components according to an independent claim, it is possible to obtain basic operational advantages described above. Also, it is possible to implement a configuration produced by mutually replacing or combining each component disclosed in the examples described above, a configuration produced by mutually replacing or combining each component of a publicly known technique and the examples described above described above, and the like. The present disclosure includes these configurations, and the like.

What is claimed is:

1. An image reading apparatus configured to connect to an external terminal, the image reading apparatus comprising:
    a reader configured to generate image data by reading a document;
    a display panel configured to display a screen;
    a touch panel configured to receive operation on the screen; and
    a controller configured to perform output processing of the image data in accordance with output settings including an output destination to receive output of the image data, the output destination being remote from the image reading apparatus,
    wherein
    the operation includes simple operation for selecting the output destination,
    when the touch panel receives the simple operation, the controller sets a countdown timer that measures a predetermined period during which a first screen indicating reading is displayed on the display panel, causes the reader to start reading the document, displays on the display panel the first screen indicating reading in a display period including a read period until reading of the document is completed, displays as part of the first screen an output destination change reception section for receiving an output destination change operation to change from the output destination to another output destination, remote from the image reading apparatus, to receive output of the image data, and displays on the display panel a second screen different from the first screen after the display period, and
    the touch panel is configured to receive change operation of the output settings in a reception period included in the display period through the output destination change reception section, and when the change operation is received, the controller performs the output processing of the image data in accordance with the changed output settings to the another output destination,
    wherein, the predetermined period is a minimum period during which the change operation can be received, the predetermined period being different than the read period.

2. The image reading apparatus according to claim 1, wherein
    the change operation includes output destination change operation for changing the output destination and
    when the touch panel receives the output destination change operation associated with the output destination change reception section, the controller performs output processing of the image data to the changed output destination.

3. The image reading apparatus according to claim 1, wherein
    the display period is a longer period between a predetermined period being a minimum period configured to receive change operation of the output settings and the read period, and
    the reception period includes the predetermined period.

4. The image reading apparatus according to claim 1, wherein
    at a point in time when reception of the change operation is completed,
    when reading of the document is completed, the controller causes the display panel to display the second screen, and
    when reading of the document is not completed, the controller causes the display panel to display the first screen.

5. The image reading apparatus according to claim 1, wherein
    the controller causes the display panel to display the first screen including information representing the changed output settings.

6. The image reading apparatus according to claim 5, wherein
    after the controller causes the display panel to display the first screen including information representing the changed output settings, the touch panel is configured to further receive the change operation in the reception period, and
    when the change operation is further received, the controller causes the display panel to display the first screen including information representing the changed output settings, and the controller performs output processing of the image data in accordance with the further changed output settings.

7. A method of controlling an image reading apparatus including a reader configured to generate image data by reading a document and a display panel configured to display a screen, wherein the image reading apparatus is configured to perform output processing of the image data in accordance with output settings including an output destination to receive output of the image data, the method comprising:
    a first step of receiving simple operation for selecting the output destination;
    when the simple operation is received, a second step of setting a countdown timer that measures a predetermined period during which a first screen indicating reading is displayed on the display panel,
    a third step of causing the reader to start reading the document, displaying on the display panel a first screen indicating reading in a display period including a read period until reading of the document is completed and displaying as part of the first screen an output destination change reception section for receiving an output destination change operation to change from the output destination to another output destination, remote from the image reading apparatus, to receive output of the image data;
    a fourth step of displaying on the display panel a second screen different from the first screen after the display period; and
    a fifth step of receiving the change operation through the output destination change operation when change operation of the output settings is performed in a reception period included in the display period, and performing the output processing of the image data in accordance with the changed output settings to the another output destination, wherein, the predetermined period is a minimum period during which the change operation can be received, the predetermined period being different than the read period.

* * * * *